United States Patent
Moody et al.

(10) Patent No.: US 7,412,437 B2
(45) Date of Patent: Aug. 12, 2008

(54) SYSTEM AND METHOD FOR SEARCHING AND RETRIEVING RELATED MESSAGES

(75) Inventors: Paul B. Moody, Hyde Park, VT (US); Daniel M. Gruen, Newton, MA (US); Steven L. Rohall, Winchester, MA (US); Bernard J. Kerr, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 456 days.

(21) Appl. No.: 10/745,588

(22) Filed: Dec. 29, 2003

(65) Prior Publication Data

US 2005/0144157 A1 Jun. 30, 2005

(51) Int. Cl.
*G06F 17/00* (2006.01)
*G06F 17/30* (2006.01)
(52) U.S. Cl. .............................. 707/3; 707/5; 707/104.1
(58) Field of Classification Search ...................... 707/4, 707/3, 5, 104.1
See application file for complete search history.

(56) References Cited

U.S. PATENT DOCUMENTS

| | | | |
|---|---|---|---|
| 5,079,700 A | 1/1992 | Kozoll et al. | 395/700 |
| 5,140,521 A | 8/1992 | Kozol et al. | 364/419 |
| 5,632,018 A | 5/1997 | Otorii | 395/200.04 |
| 5,905,863 A | 5/1999 | Knowles et al. | 395/200.36 |
| 5,928,333 A | 7/1999 | Landfield et al. | 709/245 |
| 5,930,471 A * | 7/1999 | Milewski et al. | 709/204 |
| 6,134,582 A | 10/2000 | Kennedy | 709/206 |
| 6,185,551 B1 * | 2/2001 | Birrell et al. | 707/3 |
| 6,282,565 B1 * | 8/2001 | Shaw et al. | 709/206 |
| 6,330,589 B1 | 12/2001 | Kennedy | 709/206 |
| 6,381,594 B1 * | 4/2002 | Eichstaedt et al. | 707/3 |
| 6,457,004 B1 | 9/2002 | Nishioka et al. | 707/5 |
| 6,483,905 B1 | 11/2002 | Kikinis | 379/93.24 |
| 6,496,853 B1 | 12/2002 | Klein | 709/206 |
| 6,519,571 B1 | 2/2003 | Guheen et al. | 705/14 |
| 6,592,627 B1 | 7/2003 | Agrawal et al. | 715/513 |

(Continued)

OTHER PUBLICATIONS

Whittaker, Steve, et al., "Email Overload: Exploring Personal Information Management of Email", *CHI 96*, Apr. 13-18, 1996, pp. 276-283.

(Continued)

*Primary Examiner*—Uyen T. Le
(74) *Attorney, Agent, or Firm*—Pillsbury Winthrop Shaw Pittman, LLP

(57) ABSTRACT

A system and method is provided which utilizes a threading service to offer enhanced features for a document management system including an email system. Various enhanced email features may be provided through one or more of the following components: a delete module, a reply module, a profile module, and a search module. The delete module enables a user to delete a selected message, a set of related messages, or the whole set except for the selected message. The reply module enables a user to send a reply message to all addresses associated and involved with an entire set of related messages. The profile module enables a dynamic interest profile to contain all relevant information from an outgoing message and a set of messages related to the outgoing message. The search module enables search results to include documents which match the user's query as well as documents related to the documents which match the user's query.

13 Claims, 6 Drawing Sheets

U.S. PATENT DOCUMENTS

| | | | |
|---|---|---|---|
| 6,615,241 B1 | 9/2003 | Miller et al. | 709/206 |
| 6,631,398 B1 | 10/2003 | Klein | 709/206 |
| 6,704,772 B1 | 3/2004 | Ahmed et al. | 709/207 |
| 6,769,012 B1 * | 7/2004 | Liu et al. | 709/204 |
| 6,775,243 B1 | 8/2004 | Valentine et al. | 370/255 |
| 6,822,754 B1 | 11/2004 | Shiohara | 358/1.15 |
| 6,823,368 B1 | 11/2004 | Ullmann et al. | 709/206 |
| 6,963,904 B2 | 11/2005 | Yong | 709/207 |
| 6,973,167 B2 | 12/2005 | Kikinis | 379/67.1 |
| 6,993,563 B2 | 1/2006 | Lytle et al. | 709/206 |
| 7,035,903 B1 * | 4/2006 | Baldonado | 709/206 |
| 2001/0030960 A1 | 10/2001 | Nakada et al. | 370/389 |
| 2002/0023136 A1 | 2/2002 | Silver et al. | 709/206 |
| 2002/0035607 A1 | 3/2002 | Checkoway et al. | 709/206 |
| 2002/0065891 A1 | 5/2002 | Malik | 709/206 |
| 2002/0169839 A1 | 11/2002 | Goldberg | 709/206 |
| 2002/0188689 A1 | 12/2002 | Michael | 709/206 |
| 2003/0120737 A1 | 6/2003 | Lytle et al. | 709/206 |
| 2003/0135567 A1 | 7/2003 | Reilly | 709/206 |
| 2003/0163537 A1 | 8/2003 | Rohall et al. | 709/206 |
| 2003/0233419 A1 | 12/2003 | Beringer | 709/206 |

OTHER PUBLICATIONS

Venolia, Gina Danielle, et al., "Supporting Email Workflow", *Technical Report MSR-TR-2001-88*, Microsoft Research, Microsoft Corporation, Revised Dec. 2001, (Original Sep. 2001), 11 pages.

Venolia, Gina, et al., "Understanding Sequence and Reply Relationships within Email Conversations: A Mixed-Model Visualization", *Paper: Integrating Tools and Tasks*, vol. No. 5, Issue No. 1, Proceedings of the Conference on Human Factors in Computer Systems, Ft. Lauderdale, Florida, Apr. 5-10, pp. 361-368.

Bergman, Ruth, et al., "A Personal Email Assistant", Software Technology Laboratory, HP Laboratories, Palo Alto, Aug. 22, 2002, 23 pages.

Bellotti, Victoria, et al., "Taking Email to Task: The Design and Evaluation of a Task Management Centered Email Tool", Proceedings of the Conference on Human Factors in Computer Systems, Ft. Lauderdale, Florida, Apr. 5-10, 2003, pp. 345-352.

* cited by examiner

SYSTEM AND METHOD FOR SEARCHING AND RETRIEVING RELATED MESSAGES

CROSS-REFERENCE TO RELATED APPLICATIONS

This application is related to the commonly owned co-pending U.S. patent applications entitled "System and Method for Deleting Related Messages," Ser. No. 10/745, 488, "System and Method for Replying to Related Messages," Ser. No. 10/745,495, and "System and Method for Building Interest Profiles from Related Messages," Ser. No. 10/745,589, each filed herewith and incorporated by reference in its entirety.

FIELD OF THE INVENTION

The invention relates to an email system that utilizes a threading service.

BACKGROUND OF THE INVENTION

Conventional email systems typically include a search feature that enables a user to search for a desired email message. When searching for an email message, users often have some knowledge about the desired email message. From this knowledge, users select one or more search terms to build a query. This query is used to select those messages that match the query (i.e. search for messages with "patent").

However, when a message is part of a set of related messages, some of the related messages may not include one or more of the search terms that match the query. In some cases, the related messages that do not include the search terms are ones desired by the user. In these cases, the user may find one message among the set of related messages, but not necessarily the desired message or all the related messages.

What is needed is an improved search feature that utilizes a threading service in order to provide the user with messages including one or more search terms and one or more related messages, regardless of whether the related messages include the search terms.

SUMMARY OF THE INVENTION

The invention solving these and other problems includes retrieval of a message that matches a user's query as well as a set of messages related thereto. In some embodiments, the invention retrieves the message that matches the query along other messages belonging to the same thread.

According to various embodiments of the invention, a search module allows a user to search for email messages in a variety of ways, including "Search Only for Messages that Include Search Terms" or "Search for Messages that Include Search Terms and All Messages in Thread." In some embodiments of the invention, the search module may utilize a threading service. This threading service may reside locally at a user terminal or remotely on a server.

According to various embodiments of the invention, to access aspects of the invention, a user selects a search command from, for example, a menu of the email system. Other mechanisms for initiating a search are available as would be apparent.

In some embodiments of the invention, the search module provides the user with a query box in which the user may enter one or more search terms. After entering the one or more search terms, the user may select from among various search options available to the user. These search options may include "Search Only for Messages that Include Search Terms" or "Search for Messages that Include Search Terms and All Messages in Thread."

If the user wants to receive only those messages that include the search terms, the user may select "Search Only for Messages that Include Search Terms." If the user wants to receive those messages that include the search term along with one or more related messages, the user may select "Search for Messages that Include Search Terms and All Messages in Thread."

After the user has selected a search command, the search module may generate the search results. If the selected search command is "Search Only for Messages that Include Search Terms," the search module searches and retrieves those messages that include the search terms.

If the selected search command is "Search for Messages that Include Search Terms and All Messages in Thread," the search module searches for and retrieves those messages that include the search terms. Then, for each message that includes the search terms, the search module also determines whether that message is related to other messages. In some embodiments of the invention, the search module determines whether that message belongs to a thread of messages. If so, in either case, the search module retrieves a list of messages related to the message that includes the search terms, from, for example, a threading service. Thus, for this search command, the search results include a message that includes the search terms along with messages related to that message.

In some embodiments of the invention, after the search results are complied, the search module may display the search results in various ways. The search module may display the search results in order of relevance, date or any other mechanism. In some embodiments, the search results may include an indication so that the user may recognize that a particular message includes the search terms while another message is related to a message that includes the search terms. In some embodiments, the search results may include an indication so that the user may recognize which messages are related to one another.

In some embodiments of the invention, the search results that are displayed may include an initial message of a set of related messages or thread of messages, where at least one message therein includes the search terms. The displayed initial message may include an indication whether it includes the search terms. In some embodiments, the user may expand/collapse the thread of messages from the displayed initial message.

In some embodiments of the invention, the search results that are displayed may include a message that includes the search terms. The displayed message may include an indication of whether it is related to other message, for example, as part of a thread of messages. In some embodiments, the user may expand/collapse the thread of messages from the displayed message.

Other objects and features of the invention will become apparent from the following detailed description considered in connection with the accompanying drawings. The drawings are designed for purposes of illustration only and the invention is not limited to the particulars shown therein. Various alternatives and modifications within the scope of the invention will be apparent from the description contained herein.

DETAILED DESCRIPTION OF THE INVENTION

Various embodiments of the invention are described below in terms of email systems that include one or more email messages. However, it will become apparent from reading the following description how various aspects of the invention may be used with other types of systems that include one or more items, such as, for example, file systems.

Figure 1:
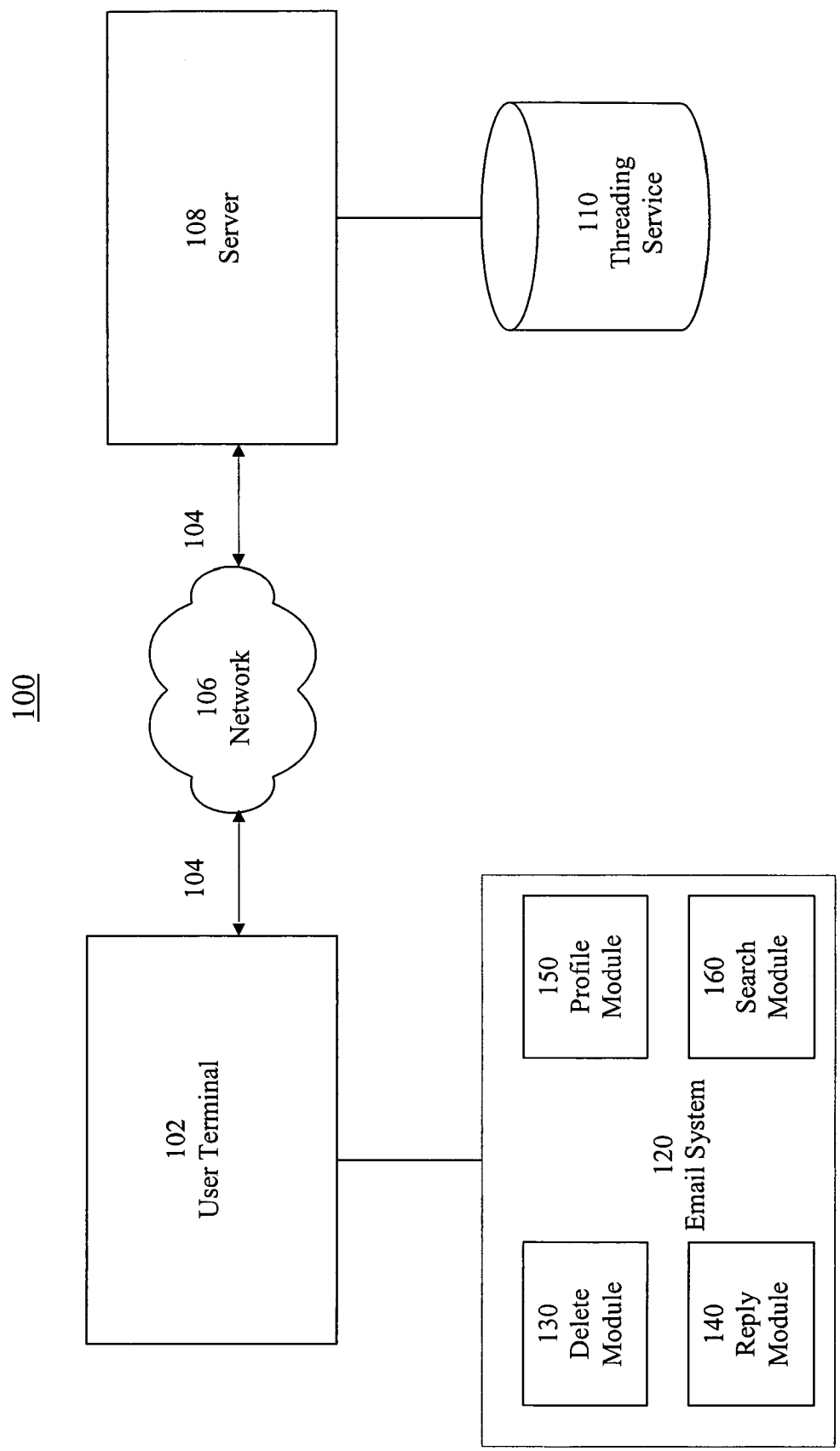
FIG. 1 illustrates an email system that utilizes a threading service according to various embodiments of the invention.

FIG. 1 illustrates a system 100 according to one embodiment of the invention. System 100 includes an email system 120 on a user terminal 102 and a threading service 110 operating on or hosted by a server 108. According to various aspects of the invention, threading service 110 provides enhanced features for email system 120. These enhanced features for email system 120 may be achieved through various components operating on or in conjunction with email system 120. These components include one or more of the following: a delete module 130, a reply module 140, a profile module 150, and a search module 160.

As illustrated in FIG. 1, threading service 110 may be utilized on server 108. It should be understood that threading service 110 may be located on user terminal 102 or any machine or machines associated with user terminal 102. While illustrated as separate from email system 120, it should also be understood that threading system 110 may be an integral part of email system 120 as would be appreciated.

As illustrated in FIG. 1, threading service 110 may be operatively coupled to server 108. Threading service 110 may include a database to store any type of data or information. Threading service 110 may include, or interface to, for example, the Oracle™ relational database sold commercially by Oracle Corporation, Informix™, DB2 (Database 2) or other data storage or query formats, platforms, or resources such as OLAP (On Line Analytical Processing), SQL (Standard Language Query), a SAN (storage area network), Microsoft Access™ or any other type of database.

Server 108 may be or include, for instance, a workstation running Microsoft Windows™ NT™, Microsoft Windows™ 2000, Microsoft Windows™ XP, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

In some embodiments of the invention, threading service 110 tracks relationships between various items including messages, documents, and/or other items. Various threading services may be used such as those described in U.S. patent application Ser. No. 10/334,087 (Publication No. U.S. 20030163537A1), entitled "Method and Apparatus for Handling Conversation Threads and Message Groupings as a Single Entity," filed Dec. 30, 2002, and U.S. patent application Ser. No. 09/995,151 (Publication No. U.S. 20030101065A1), entitled "Method and Apparatus for Maintaining Conversation Threads in Electronic Mail," filed Nov. 27, 2001, the specifications of which are herein incorporated by reference in their entirety. It should be noted that the invention is not limited to any particular mechanism for determining threads among a set of documents including email messages. Other threading services may also be used as would be apparent.

User terminal 102 may be operatively coupled over a network 106 via a communications link 104. Examples of user terminal 102 may include any one or more of, for example, a desktop computer, a laptop or other portable computer, a hand-held computer device such as a Blackberry, a Personal Digital Assistant (PDA), a web-enabled mobile phone, or a Palm Pilot, or any other computer device.

Network 106 may include any one or more networks. For example, network 106 may include the Internet, an intranet, a PAN (Personal Area Network), a LAN (Local Area Network), a WAN (Wide Area Network), a SAN (Storage Area Network), a MAN (Metropolitan Area Network), or other network.

Communications link 104 may include any one or more communications links. For example, communications link 104 may include a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, or other communications link.

Figure 2:
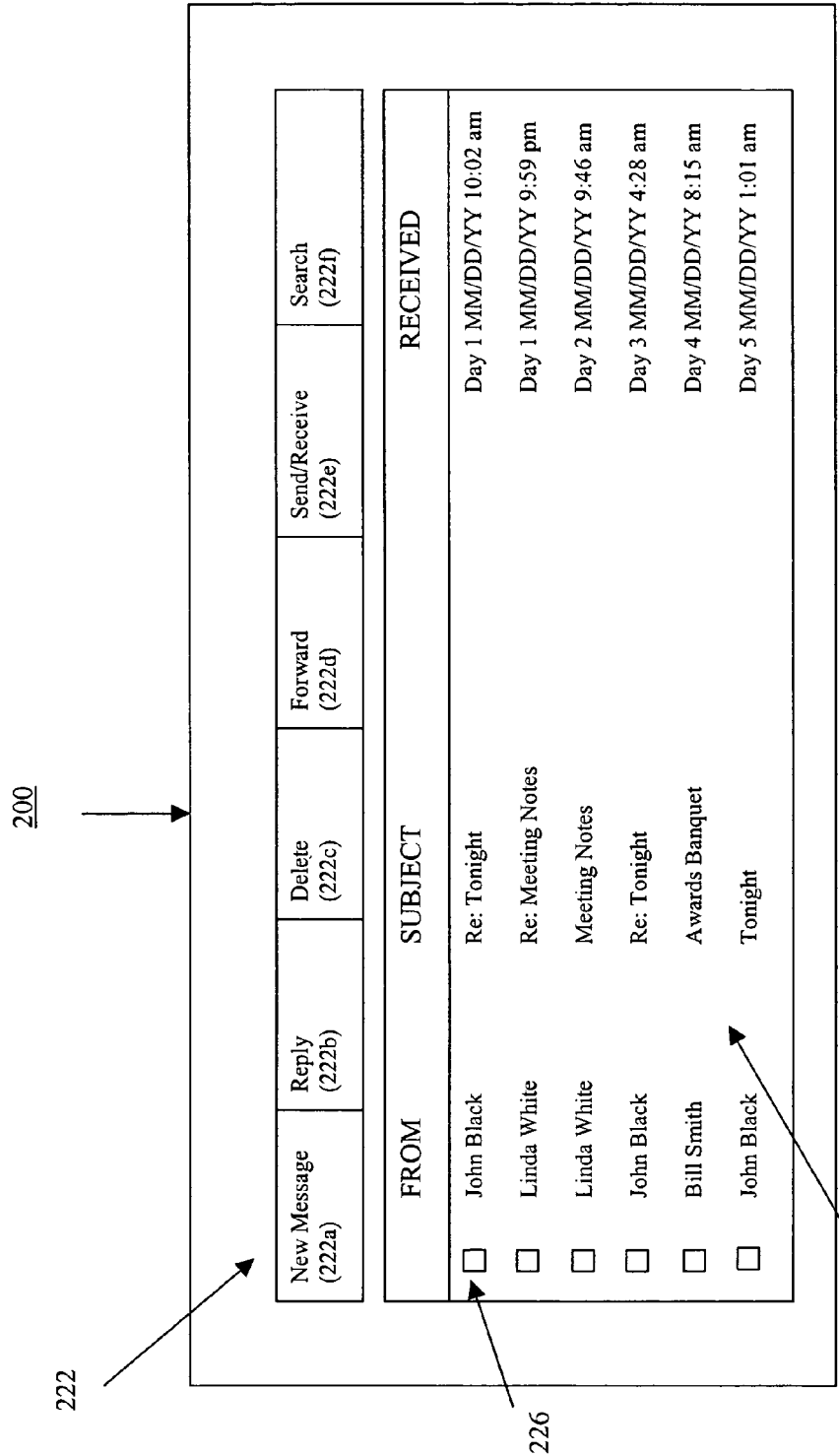
FIG. 2 illustrates a user interface for an email system according to various embodiments of the invention.

FIG. 2 illustrates an exemplary user interface 200 for email system 120 according to various embodiments of the invention. User interface 200 may includes a toolbar 222 from which a user may manage one or more email messages in email system 120. Toolbar 222 may include various items related to email features including any one or more of New Message 222a, Reply 222b, Delete 222c, Forward 222d, Send/Receive 222e, Search 222f. Toolbar 222 may include other items corresponding to other email feature as would be apparent.

Items included in toolbar 222 allow a user to access various aspects of the invention. For example, selecting Reply 222b invokes access to reply module 140, selecting Delete 222c invokes access to delete module 130, and selecting Search 222f invokes accesses to search module 160.

Further, user interface 200 may also include a list of messages 224 for presentation and display to the user. For example, list of message 224 may include new and saved email messages for the user. In some embodiments of the invention, each message of message set 224 includes a selection box 226 as illustrated Selection box 226 allows a user to select one or more messages and subsequently direct a performance of an action on that message, such as, for example reply, forward, or delete or other action. Although messages are described as being selected via selection box 226 in user interface 200, messages may be selected in various other ways, such as highlighting a message, clicking on a message, or any other mechanism for selecting messages as would be apparent.

Figure 3:
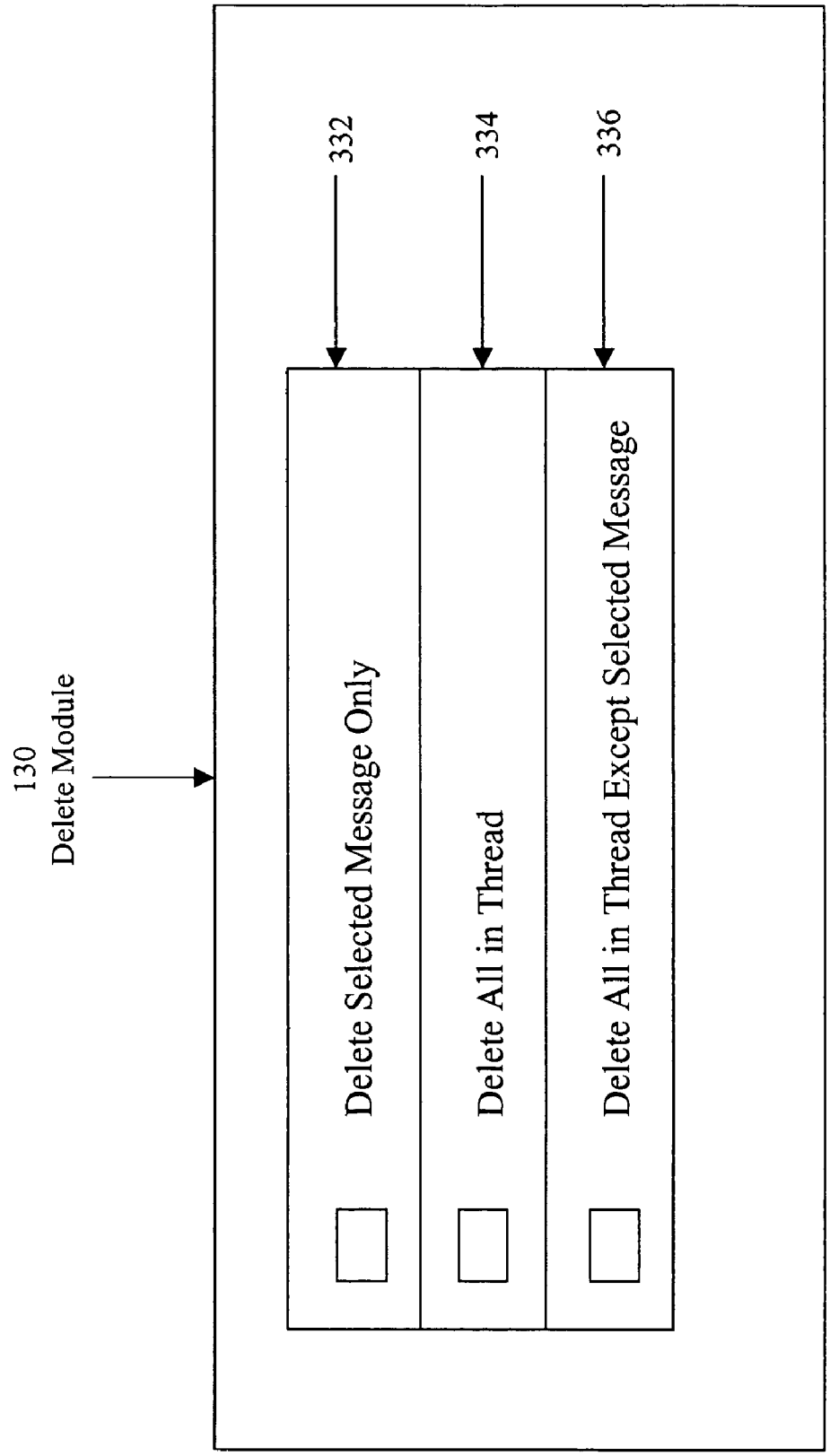
FIG. 3 illustrates various delete options provided by a delete module of an email system according to one embodiment of the present invention.

FIG. 3 illustrates various delete options that may be incorporated into user interface 200 and provided or otherwise controlled by delete module 130 according to one or more embodiments of the invention. Delete module 130 allows a user to delete a selected message and/or related messages in a variety of ways, including "Delete Selected Message Only" 332, "Delete All in Thread" 334, or "Delete All in Thread Except Selected Message" 336. Depending on which delete option is selected, delete module 130 may access threading service 110.

To utilize delete module 130 of the invention, a user selects one or more messages from list of messages 224 presented in user interface 200. As discussed above, the user may accomplish this using selection box 226 or some other selecting mechanism. In some embodiments, the selected message may be a message that the user wishes to delete. In some embodiments, the selected message may be a message that the user wishes to keep, but the user may wish to delete any or all related messages except the selected message. In some embodiments, the user may wish to delete the selected message and all related messages.

After selecting a message, the user may select "Delete" 222c from toolbar 222 of email system 120. Selecting "Delete" 222c accesses or otherwise invokes delete module 130. Subsequently, delete module 130 may request a list of messages related to the selected message from threading service 110. The list of related messages includes the selected message and all messages in the same "thread," or all messages determined by threading service 110 to be related to the selected message. The list of related messages may be stored in a temporary memory buffer (not shown) of email system 120 and accessed by delete module 130.

In some embodiments, after delete module 130 retrieves the list of related messages, delete module 130 may display various delete commands that provide the user with various delete options. These delete options may include "Delete Selected Message Only" 332, "Delete All in Thread" 334, or "Delete all in Thread Except Selected Message" 336. The user may then select one of these in accordance with the action the user wishes to take. In some embodiments of the invention, if the user wishes to delete only the selected message, the user selects "Delete Selected Message Only" 332. In some embodiments of the invention, if the user wishes to keep the selected message, but to delete all related messages, the user selects "Delete All in Thread Except the Selected Message" 336. In some embodiments of the invention, if the user wishes to delete the selected message and all related messages, the user selects "Delete All in Thread."

After the user has selected a delete command, delete module 130 causes the appropriate messages to be deleted. If the selected delete command was "Delete All in Thread Except the Selected Message" 336, each of the messages in the list of related message is compared with the originally selected message. Those that do not match are deleted, leaving the originally selected message. In some embodiments of the invention, delete module 130 may simply mark the messages for deletion for the benefit of another service (not otherwise illustrated) that actually deletes the messages as would be apparent. In some embodiments of the invention, actual deletion may occur at contemporaneously, at a time specified by email system 120, at a time specified by the user, or at a time determined by the deletion service.

If the selected delete command was "Delete All in Thread" 334, each of the messages in the list of related messages, including the selected message is be deleted. As discussed above, delete module 130 may simply mark the messages for deletion for the benefit of another service.

If the selected delete command was "Delete Selected Message Only" 332, the originally selected message is deleted. Again, as discussed above, delete module 130 may simply mark the selected message for deletion.

Figure 4:
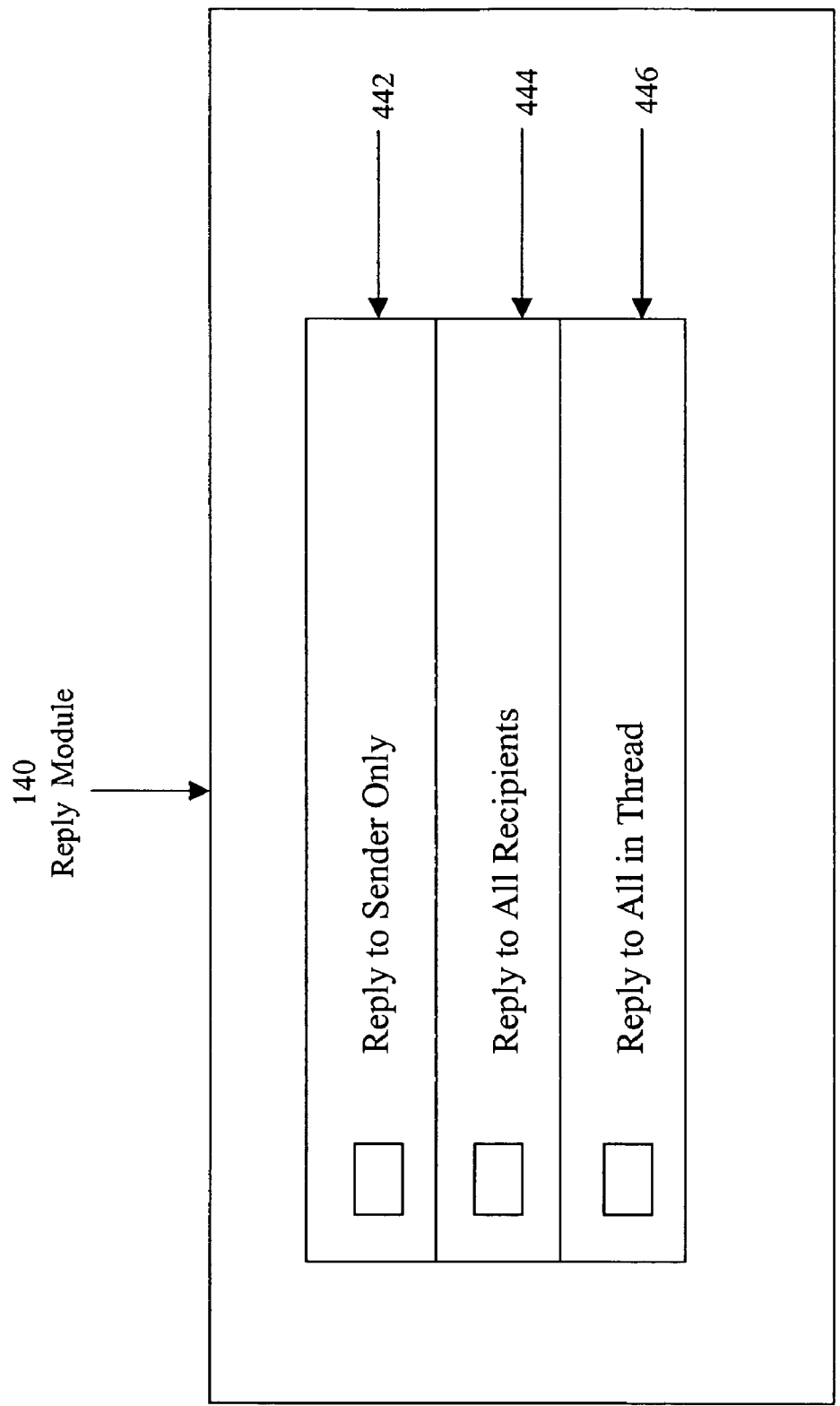
FIG. 4 illustrates various reply options provided by a reply module of an email system according to one embodiment of the present invention.

FIG. 4 illustrates reply options that may be incorporated into user interface 200 and provided or otherwise controlled by reply module 140 according to one or more embodiments of the invention. Reply module 140 allows a user to reply to a selected message in a variety of ways, including "Reply to Sender Only" 442, "Reply to All Recipients" 444, or "Reply to All in Thread" 446. Depending on which delete option is selected, reply module 140 may access threading service 110.

To utilize reply module 140 of the invention, a user selects one or more messages from list of messages 224 presented in user interface 200. As discussed above, the user may accomplish this using selection box 226 or some other selecting mechanism. In some embodiments of the invention, the use may wish to reply to only the sender of the selected message. In some embodiments of the invention, the user may wish to reply to all the recipients of the selected message. In some embodiments of the invention, the user may wish to reply to all the recipients who received the selected message or any message related to the selected message.

After selecting a message, the user may select "Reply" 222b from toolbar 222 of email system 120. Selecting "Reply" 222b accesses or otherwise invokes reply module 140. Subsequently, reply module 140 may display various reply commands that provide the user with various reply options. These reply options may include "Reply to Sender Only" 442, "Reply to All Recipients" 444, or "Reply to All in Thread" 446. The user may then select one of these in accordance with the action the user wishes to take. In some embodiments of the invention, if the user wishes to send a reply only to the sender of the selected message, the user selects "Reply to Sender Only" 442. In some embodiments of the invention, if the user wishes to send a reply to all recipients of the selected message, the user selects "Reply to All Recipients" 444. In some embodiments of the invention, if the user wishes to send a reply to all the recipients of the selected message or any message related to the selected message, the user selects "Reply to All in Thread" 446.

After the user has selected a reply command, reply module 140 causes the appropriate reply message to be generated. If the selected reply command was "Reply to Sender Only" 442, reply module 140 simply inserts an address of the sender of the selected message into a reply message. In some embodiments of the invention, reply module 140 retrieves an email address from the "From" field of the selected message and inserts it into the "To" field of the reply message as would be apparent.

If the selected reply command was "Reply to All Recipients" 444, reply module 140 inserts an address of the sender and all recipients of the selected message into a reply message. In some embodiments of the invention, reply module 140 retrieves email addresses from the "From," "To," "CC," and/or "BCC" fields of the selected message and inserts them into a corresponding field in the reply message as would be apparent.

If the selected reply command was "Reply to All in Thread" 446, reply module 140 inserts an address of the sender, all recipients of the selected message, and all recipients of messages related to the selected message into a reply message. In some embodiments of the invention, reply module retrieves email addresses from a list of messages related to the selected message. In some embodiments of the invention, this may be accomplished using header information associated with each of the messages in the list of related messages to collect unique names or addresses from the address fields therein. These names or addresses may then be inserted into corresponding fields in the reply message.

In some embodiments of the invention, in order to "Reply to All in Thread," reply module 140 may request a list of messages related to the selected message from threading service 110. The list of related messages includes the selected message and all messages in the same "thread," or those messages determined by threading service 110 to be related to the selected message. The list of related messages may be stored in a temporary memory buffer (not otherwise illustrated) of email system 120. Reply module 140 may access the temporary memory buffer and retrieve the list of related messages.

In some embodiments of the invention, reply module 140 may gather header information for each message in the list of related messages. The header information gathered by reply module 140 may include a variety of data fields that are used for addressing, including, but not limited to: "From," "To," "CC," "BCC," "Sent on behalf of," "Reply to," or any other address data field.

In some embodiments of the invention, reply module 140 may collect the names or addresses from the address fields of the header data from each related message, and adds only those unique names or addresses to a stored list. The stored list of gathered header information may be stored in the temporary memory buffer (not otherwise illustrated). In some embodiments of the invention, the stored list may include information regarding the field from which the names or addresses originated. For example, "Joe Smith" may have been in the "From" field in one message and in the "To" field of a second message.

After the stored list of names or addresses has been compiled, reply module 140 may create a reply message that is related to the originally selected message. In some embodiments of the invention, reply module 140 may insert the names or addresses from the stored list of names or addresses into fields of the reply message corresponding to the fields from which the names or addresses originated (i.e., originating fields). In some embodiments of the invention, the corresponding field is determined by a rule set that specifies which originating fields cause names to be inserted into which address fields of the reply message with priority information should the name or address originate in more than one type of field.

In some embodiments of the invention, the user may also insert additional names or addresses into the address fields of the reply message as would be apparent.

Figure 5:
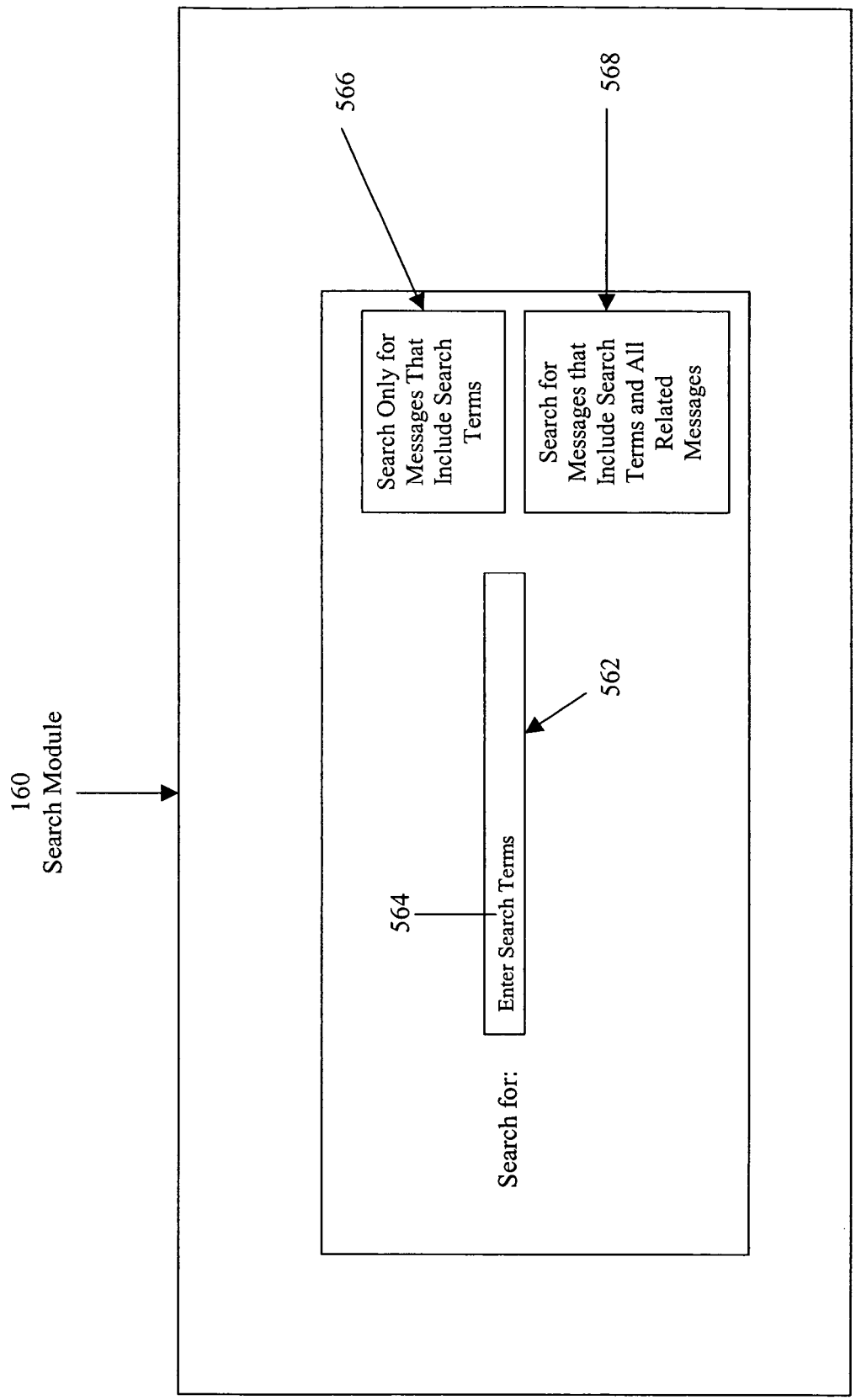
FIG. 5 illustrates various search options provided by a search module of an email system according to one embodiment of the present invention.

FIG. 5 illustrates various search options that may be incorporated into user interface 200 and provided or otherwise controlled by search module 160 according to one or more embodiments of the invention. Search module 160 allows a user to search a list of messages 224 and/or related message in a variety of ways, including "Search Only for Messages that Include Search Terms" 566 or "Search for Messages that Include Search Terms and All Related Messages" 568. Depending on which search option is selected, search module 160 may access threading service 110.

To utilize search module 160 of the invention, a user selects menu item "Search" 222*f* from toolbar 222 of email system 120. Selecting menu item "Search" 222*f* accesses or otherwise invokes search module 160. Subsequently, search module 160 may display a query box 562 in which a user may enter one or more search terms 564. The user may then enter search terms 564 comprising of a variety of text that is to be sought in list of message 224 as would be apparent.

After the user enters search terms 564 into query box 562, the user may select from one or more search options provided by search module 160. These search options may include "Search Only for Messages that Include Search Terms" 566 or "Search for Messages that Include Search Terms and All Related Messages" 568. The user may select one of these in accordance with the action the user wishes to take. In some embodiments of the invention, if the user wishes to retrieve only those messages that include search terms 564, the user may select "Search Only for Messages that Include Search Terms" 566. In some embodiments of the invention, if the user wishes to retrieve those messages that include search terms 564 and all messages that are related thereto, the user may select "Search for Messages Containing Search Terms and All Related Messages" 568.

After the user has selected a search command, search module 160 causes the appropriate search results to be generated. If the selected search command is "Search Only for Messages that Include Search Terms" 566, search module 160 searches message set 224 for messages that include search terms 564 as would be apparent and provides those message as search results.

If the selected search command is "Search for Messages that Include Search Terms and All Related Messages" 568, search module 160 searches message set 224 for messages including search terms 564. Then, for each message that includes search terms 564, search module 160 also determines and/or retrieves messages related thereto, whether or not the related messages include search terms 564. Search module 160 searches each message of message set 224 for entered search terms 564. In some embodiments of the invention, if the search terms are found including a particular message, search module 160 determines whether the particular message belongs to a thread. If so, search module 160 requests a list of messages related to the particular message from, for example, threading service 110. This list of related messages may include the matching message and all messages in the same "thread," or those messages determined by threading service 110 to be related to the particular message. The list of related messages may be stored in a memory buffer (not shown) of email system 120. Search module 160 may access and retrieve the list of related messages from the particular memory buffer. Search module 160 provides search results that include the message that included the search terms 564 and the list of messages related thereto.

In some embodiments of the invention, after the search results are complied, search module 160 may display the search results in various ways. Search module 160 may display the search results in order of relevance, date or any other mechanism. In some embodiments, the search results may include an indication so that the user may recognize that a particular message includes search terms 564, while another message is related to a message that includes search terms.

In some embodiments of the invention, the search results may be displayed such that only a set of related messages or thread of a message, where at least one message there includes the search terms 564. In some embodiments of the invention, the user may expand/collapse the initial message to view the entire list of related messages.

In some embodiments of the invention, the search results that are displayed may include these messages that include search terms 564. The displayed results may include an indication of whether the message is related to other messages. In some embodiments, the user may expand/collapse the message to view the list of related messages.

Figure 6:
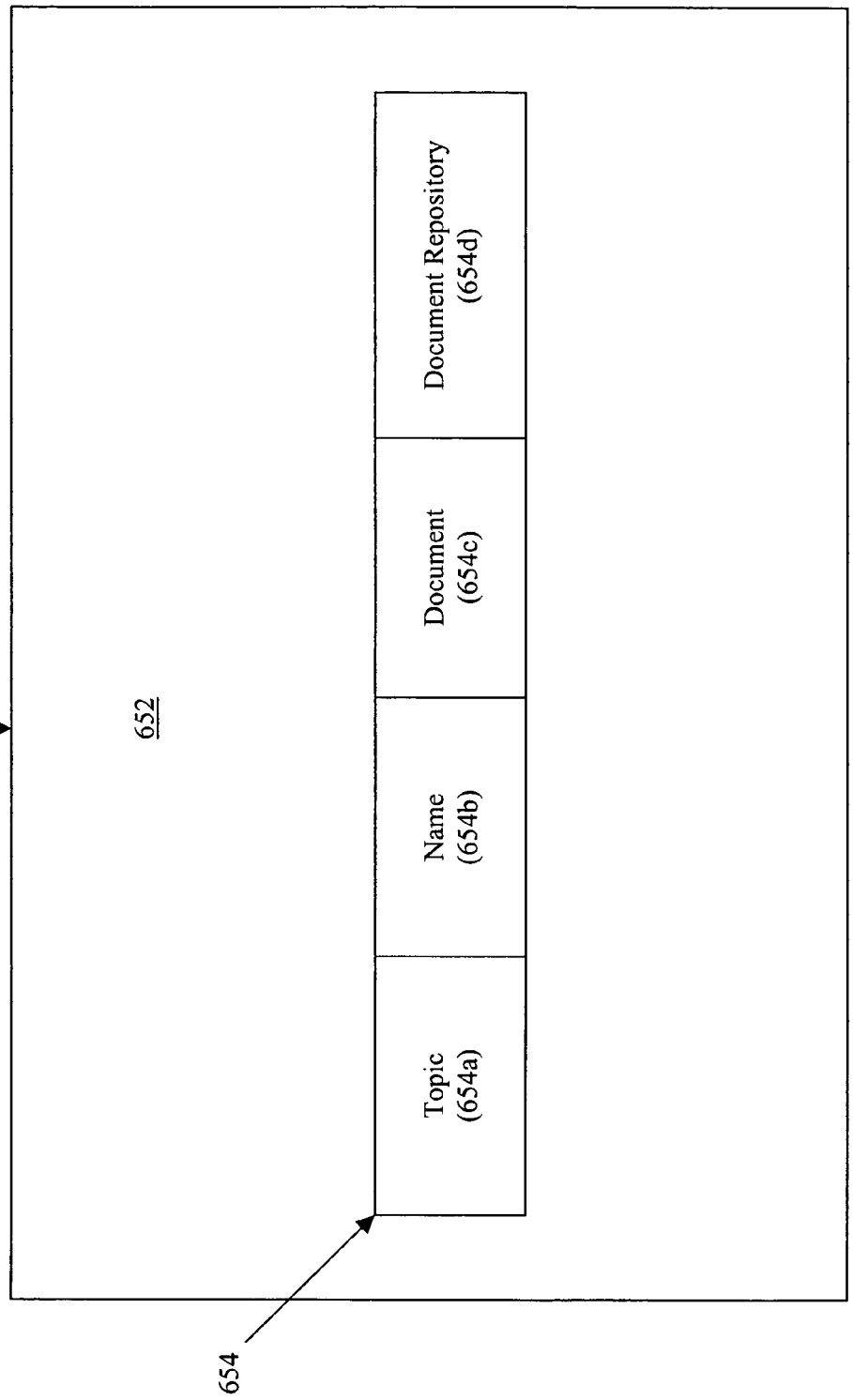
FIG. 6 illustrates a profile module of an email system according to one embodiment of the present invention.

FIG. 6 illustrates profile module 150 according to the various embodiments of the invention. In some embodiments, profile module 150 may use threading service 110 to expand topics and names used to create a dynamic interest profile 652. Dynamic interest profile 652 may be generated and updated on the email system 120 of user terminal 102.

In some embodiments of the invention, profile module 150 automatically constructs dynamic interest profile 652 in order to sort, cluster, and otherwise call attention to messages that may be of interest to a user. Dynamic interest profile 652 may include items 654 of user interest including topics 654*a*, names 654*b*, documents, 654*c*, document repositories 654*d*, or other items of user interest.

In some embodiments of the invention, profile module 150 may monitor all outgoing messages that a user sends from email system 120. Outgoing messages and messages related thereto may be used to construct items 654 of dynamic interest profile 652, as described further below.

For each outgoing message, profile module 150 identifies whether the outgoing message related to other messages, by, for example, being related to a thread. If so, profile module 150 requests a list of messages related to the outgoing message from threading service 110. The list of related messages includes the outgoing message and all messages in the same "thread," or all those messages determined by threading service 110 to be related to the outgoing message. The list of related messages may be stored in a memory buffer (not shown) of email system 120. Profile module 150 may access and retrieve messages from the memory buffer.

Profile module 150 scans the outgoing message and its related messages for terms to add to dynamic interest profile 652. The related messages may be incoming or outgoing messages. In some embodiments of the invention, the profile module 150 may include an algorithm for weighting the terms added to dynamic interest profile 652, such that, for example, the most relevant or frequently occurring terms appear first in dynamic interest profile 652. In some embodiments of the invention, incoming and outgoing messages may be weighted differently according to the algorithm.

While particular embodiments of the invention have been described, it is to be understood that modifications will be apparent to those skilled in the art without departing from the spirit of the invention. The scope of the invention is not limited to the specific embodiments described herein. Other embodiments, uses and advantages of the invention will be apparent to those skilled in art from consideration of the specification and practice of the invention disclosed herein. The specification should be considered exemplary only, and the scope of the invention is accordingly intended to be limited by the following claims.

What is claimed is:

1. A method for searching a plurality of electronic messages exchanged between a plurality of users in one or more conversation threads, the method comprising:

receiving a search query including search terms from a user;

searching the plurality of electronic messages to identify one or more electronic messages that satisfy the search query, wherein the one or more electronic messages that satisfy the search query are included within one or more conversation threads;

identifying one or more additional electronic messages that are included in the one or more conversation threads that include the one or more electronic messages that satisfy the search query wherein the one or more additional electronic messages do not contain said search terms; and presenting a search result to the user, wherein the search result includes (i) a listing of the one or more electronic messages that satisfy the search query, and (ii) indicia associated with individual ones of the one or more electronic messages that satisfy the search query, wherein the indicia associated with a given electronic message that satisfies the search query identify the one or more additional electronic messages that are included in the one or more conversation threads that include the given electronic message that satisfies the search query.

2. The method of claim 1, wherein the indicia are selectable and the presentation of the search result is expandable such that selection of the indicia associated with the given electronic message by the user results in the expansion of the presented search result to include the one or more additional electronic messages that are included in the one or more conversation threads that include the given electronic message that satisfies the search result.

3. The method of claim 2, wherein when the user selects the indicia to expand the search result to include the one or more additional electronic messages, the search result further comprises, for each of the respective one or more additional electronic messages included in the search result, an indication to the user whether the respective electronic message satisfies the search query.

4. The method of claim 2, wherein said indicia comprise one or more embedded links to the one or more additional electronic messages that are included in the one or more conversation threads that include the given electronic message that satisfies the search query.

5. The method of claim 1, wherein identifying one or more additional electronic messages that are included in the one or more conversation threads that include the one or more electronic messages that satisfy the search query comprises submitting a query to a threading service that tracks relationships between electronic messages.

6. The method of claim 1, wherein the electronic messages comprise email messages.

7. The method of claim 1, wherein a conversation thread includes an initial electronic message that begins the conversation thread, a series of additional electronic messages that reply to the initial electronic message, and further electronic messages that reply to one or more of the electronic messages included in the series of additional electronic messages that reply to the initial electronic message.

8. A method for searching a plurality of electronic messages exchanged between a plurality of users in one or more conversation threads, the method comprising:

receiving a search query including search terms from a user;

searching the plurality of electronic messages to identify one or more electronic messages that satisfy the search query, wherein the one or more electronic messages that satisfy the search query are included within one or mere conversation threads;

identifying one or more additional electronic messages that are included in the one or more conversation threads that include the one or more electronic messages that satisfy the search query wherein the one or more additional electronic messages do not contain said search terms; and presenting a search result to the user, wherein the search result includes, for individual ones of the one or more electronic messages that satisfy the search query, the one or more additional electronic messages that are included in the one or more conversation threads that include the individual ones of the one or more electronic messages that satisfy the search query.

9. The method of claim 8, wherein the search result includes, for a given conversation thread that includes at least one of the one or more electronic messages that satisfy the search query, an initial electronic message, wherein the initial electronic message was temporally the first message in the given conversation thread.

10. The method of claim 9, further comprising presenting an indication to the user whether the initial electronic message satisfies the search query.

11. The method of claim 9, further comprising, in response to a user selection of a selectable indicia associated with the initial electronic message, collapsing the search result by removing the electronic messages included in the given conversation thread from the search result, with the exception of the initial electronic message.

12. The method of claim 9, further comprising presenting, for each electronic message in the given conversation thread, an indication whether the electronic message satisfies the search query.

13. The method of claim 8, wherein a conversation thread includes an initial electronic message that begins the conversation thread, a series of additional electronic messages that reply to the initial electronic message, and further electronic messages that reply to one or more of the electronic messages included in the series of additional electronic messages that reply to the initial electronic message.

* * * * *